United States Patent Office 3,476,757
Patented Nov. 4, 1969

3,476,757
TETRAHYDROPYRANYL AND TETRAHYDRO-FURANYL ETHERS OF BENZOMORPHANS AND MORPHANANS
Alexander D. Cross, Mexico City, Mexico, assignor to Syntex Corporation, Panama, Panama, a corporation of Panama
No Drawing. Filed Apr. 18, 1966, Ser. No. 543,028
Int. Cl. C07d 43/32, 99/04; A61k 27/00
U.S. Cl. 260—268                           13 Claims

ABSTRACT OF THE DISCLOSURE

The 2'-(tetrahydropyran - 2 - yl) and 2'-(tetrahydro-furan-2-yl) ethers of 6,7-benzomorphan, morphine and their derivatives have analgesic and antitussive properties and are useful in treating pain and cough. The 2'-hydroxy compound can be added to the respective dihydropyran or dihydrofuran using an acid catalyst to form the ether.

---

The present invention relates to novel organic compounds and to processes for their preparation.

In particular, this invention pertains to 2'-(tetrahydropyran-2-yloxy)-6,7-benzomorphan and 2'-(tetrahydrofuran-2-yloxy)-6,7-benzomorphan derivatives.

The compounds of the present invention may be represented by the formula:

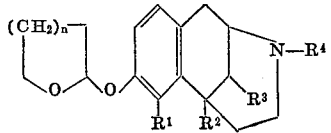

(I)

wherein:

$n$ has a value of 1 or 2;
$R^1$ is hydrogen or, when taken with $R^5$, oxido;
$R^2$ is hydrogen, lower alkyl, lower alkoxy lower alkyl, phenyl or halophenyl;
$R^3$ is hydrogen or lower alkyl;
$R^2$ and $R^3$ taken together are:

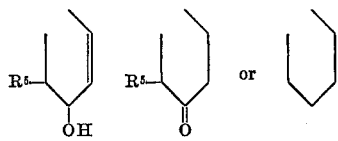

in which:

$R^5$, together with $R^1$, is oxido;
$R^4$ is hydrogen, —$(C_xH_{2x})$—$R^6$, —$(C_yH_{2y-2})$—$R^6$, —$(C_zH_{2z-3})$

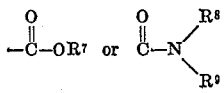

in which:

$R^6$ is hydrogen, hydroxy, alkoxy, halogen, cyclopropyl, phenyl, halophenyl or aminophenyl;
$R^7$ is lower alkyl or phenyl;
$R^8$ and $R^9$, independent of the other, are each hydrogen, lower alkyl, lower alkenyl, phenyl, halophenyl or, taken together, $\alpha,\omega$-alkylene of from 4 to 5 carbon atoms inclusively, or ethyleneoxyethyl;
$x$ has a value of from 1 to 6; and
each of $y$ and $z$ has a value of from 2 to 7.

The foregoing compounds possess analgesic and antitussive properties and are thus useful in the treatment of pain and cough. Some of these compounds also demonstrate morphine antagonism and are useful in combating narcotic overdosage and in the treatment of narcotic addiction. The compounds of the present invention may be administered in the usual pharmaceutical compositions adapted to the route of administration such as orally, parenterally, rectally or the like, in doses appropriate for the condition being treated. These derivatives are particularly advantageous when administered orally due to their absorption and long period of activity.

Referring now to the above structural formula, the value of $n$ may be 1 or 2, i.e., the group so qualified may be methylene or ethylene, thus delineating a tetrahydrofuran or tetrahydropyran ring structure. This ring structure is bound via an oxygen ether linkage to the 2'-position of the benzomorphan nucleus. The 5-position of the benzomorphan nucleus may be unsubstituted ($R'$=hydrogen) or may bear a lower alkyl group such as methyl, ethyl, propyl, isopropyl and the like, a lower alkoxy-lower alkyl group such as 2-ethoxyethyl, 3-methoxypropyl, 2-methoxyethyl and the like, a phenyl group or a phenyl group which may be substituted by one or more halo atoms such as chloro or fluoro. Alternatively, the 5-position may be connected to the 9-position through an $\alpha,\delta$-butylene group ($R^2$ and $R^3$=—$CH_2CH_2CH_2CH_2$—)

thus providing compounds having the tetracyclic morphinan nucleaus.

Moreover, this butylene group may be linked to the 1'-position of the benzo portion of the nucleus via an oxido bridge ($R^1$ and $R^5$ together are oxido) and may bear either a ketone or an allylic hydroxy group. The structures of these nuclei thus correspond to the tetracyclic system of morphine and codeine on one hand and that of dihydromorphinone and dihydrocodeinone on the other.

When not linked to the 5-position, the 9-position of the 6,7-benzomorphan nucleus in the compounds of the present invention may be unsubstituted ($R^3$=hydrogen) or may be substituted by a lower alkyl group such as methyl or ethyl. Moreover, such alkyl groups may be of either the $\alpha$ or $\beta$ configuration, i.e., cis or trans respectively with respect to the substituent in the 9-position.

The nitrogen atom of the 6,7-benzomorphan nucleus may be unsubstituted ($R^4$=hydrogen) but preferably is substituted. When substituted, the substituent may be one of an essentially hydrocarbon nature, these compounds thus being characterized by the following formulas:

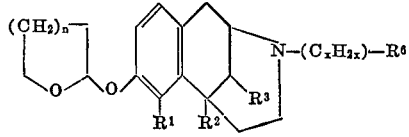
(II)

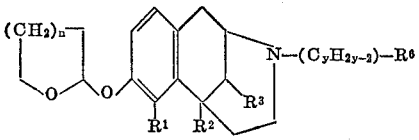
(III)

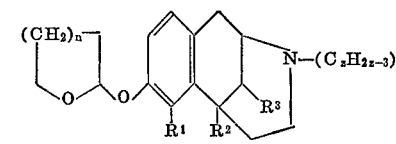
(IV)

in which $R^1$, $R^2$, $R^3$, $R^6$, $n$, $x$, $y$ and $z$ are as defined above. Thus, the nitrogen atom may be substituted by an alkyl group, such as in Formula II, an alkenyl group such as in Formula III, or an alkynyl group such as in Formula IV. In the case of the alkyl or alkenyl substituents, these may in turn be substituted by a hydroxy group, a lower alkoxy group, a halogen atom such as chloro or fluoro, a cyclopropyl group, a phenyl group, a halophenyl group such as chlorophenyl or fluorophenyl, or an aminophenyl group. A particularly preferred class of nitrogen substituents consists of methyl, phenylethyl, cyclopropylmethyl, allyl, 3-chloroallyl (cis), and 3,3-dimethylallyl (i.e., 3-methylbut-2-enyl).

The substituent on the nitrogen atom may also be bound via a group which is nonhydrocarbon in nature, thus providing benzomorphans of a predominantly neutral character. These derivatives may be represented by the following structural formulas:

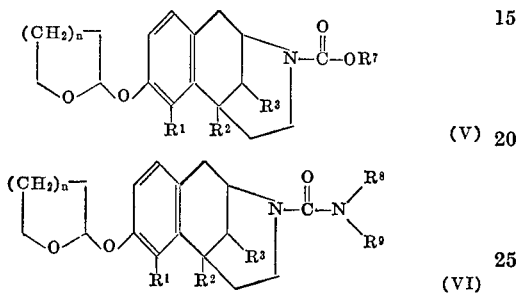

in which $R^1$, $R^2$, $R^3$, $R^7$, $R^8$, $R^9$ and $n$ are as defined above. Thus included are the carbamates of Formula V wherein $R^7$ may be lower alkyl or phenyl, i.e., the nitrogen atom is substituted by a carboalkoxy or carbophenoxy group, and the ureido derivatives of Formula VI wherein each of $R^8$ and $R^9$ may be hydrogen, lower alkyl, lower alkenyl, phenyl, halophenyl or, taken together, an $\alpha,\omega$ alkylene group of from 4 to 6 carbon atoms or ethyleneoxyethyl. In these latter two instances, $R^8$ and $R^9$ together with the nitrogen atom to which they are attached thus form a pyrollidine or piperidine ring or a morpholine ring, respectively.

When used in the present specification and claims, the term "lower alkyl" and derivations thereof such as lower alkoxy, lower alkanoyl and the like, is intended to mean a straight or branched hydrocarbon group of up to and including 6 carbon atoms. In the case of the terms "alkenyl" and "alkynyl," these groups will of necessity contain at least 2 carbon atoms and may contain up to and including 7 carbon atoms.

One particularly preferred subclass of the present invention may be represented by the formula:

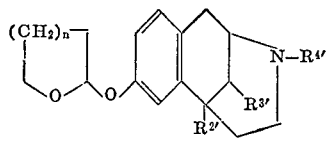

wherein:

$R^{2'}$ is hydrogen, methyl, phenyl or $\beta$-methoxyethyl;
$R^{3'}$ is hydrogen, methyl or ethyl;
$R^{4'}$ is methyl, phenylethyl, cyclopropylmethyl, allyl, 3-chloroallyl or 3,3-dimethylallyl; and
$n$ is as described above.

The compounds of the present invention are prepared via treatment of a 2'-hydroxy benzomorphan with an excess of a cyclic enol ether of Formula VI. The reaction is conducted in the presence of an acidic catalyst such as p-toluenesulfonyl chloride, dinitrobenzenesulfonyl chloride, benzenesulfonyl chloride, methanesulfonyl chloride, p-toluenesulfonic acid, dinitrobenzenesulfonic acid, benzenesulfonic acid, and the like. Generally, the reaction proceeds at normal room temperatures such as about 25° C. and may be optionally executed in the presence of inert, nonaqueous, organic solvents such as benzene, tetrahydrofuran, diglyme, toluene, or the like, and generally under an inert atmosphere such as nitrogen. This reaction may be represented as follows:

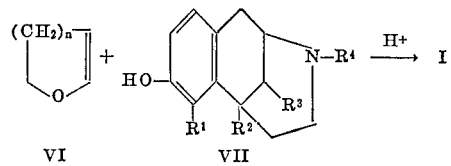

In the foregoing, $R^1$, $R^2$, $R^3$, $R^4$ and $n$ are as previously described.

The compounds of the present invention are also obtained via an alternative procedure in which a 2'-hydroxy-6,7-benzomorphan of Formula VII is first treated with a base, as for example sodium hydride, to form the corresponding sodium phenoxide derivative. This intermediate is then treated in turn with a $\alpha$-haloether of Formula VIII, preferably a chloro, bromo or iodo ether. This route may be represented as follows:

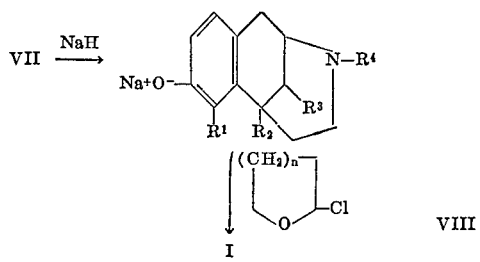

In the foregoing, $R^1$, $R^2$, $R^3$, $R^4$ and $n$ are as previously defined.

In those instances in which $R^2$ and $R^3$ are bridged (thus forming a morphinan structure) and a second hydroxy group is present in the 6-position of the morphinan nucleus, it is preferable in both routes to form the 6-monoacetate prior to effecting etherification of the phenolic hydroxy group in the 3-position of the morphinan nucleus (e.g., the 2'-position in the benzomorphan nucleus). This may be accomplished by first forming the 3,6-diacetoxymorphinan derivative as by treatment with acetic acid and pyridine. This diacetate is then treated briefly with an organic acid, such as acetic acid, thus effecting selective cleavage of the 3-acetoxy group. The resultant 3-hydroxy-6-acetoxy derivative is then etherified as heretofore described and thereafter saponified as with an alkali metal bicarbonate or hydroxide to regenerate the 6-hydroxy group.

Numerous representative benzomorphan (including morphinan) starting materials for the process of the present invention are readily available on a commercial basis, are described in the literature, or can be prepared via conventional techniques. Such techniques include, as for example, the cyclization of an appropriately substituted 2-benzyl-1,2,5,6-tetrahydropyridine in the presence of a Lewis acid such as hydrogen bromide with subsequent cyanogen bromide dealkylation and realkylation.

EXAMPLE 1

Two milliliters of dihydropyran are added to a solution of 1 g. of 2'-hydroxy-2-cyclopropylmethyl-5,9-dimethyl-6,7-benzomorphan in 20 ml. of anhydrous benzene. About 1 ml. of solvent is collected by distillation to remove any moisture, and 0.4 g. of p-toluenesulfonyl chloride is then added to the cooled solution and the mixture is allowed to stand at ambient room temperature (about 25° C.) for four days. At the end of this time, the mixture is washed with an aqueous sodium carbonate solution and water, dried and evaporated to dryness under reduced pressure. The residue is chromatographed on neutral alumina, eluting with hexane, to yield 2'-(tetrahydropyran-2-yloxy)-2-cyclopropylmethyl-5,9-dimethyl - 6,7 - benzomorphan.

EXAMPLE 2

To a slurry of 16.0 g. of sodium hydride in 50 ml. of dry diethyleneglycol dimethyl ether under an inert nitrogen atmosphere is added 39.5 g. of 2'-hydroxy-2-(3-methylbut-2-enyl)-5,9-dimethyl-6,7-benzomorphan in sufficient dry diethyleneglycol dimethyl ether in a dropwise fashion over a period of 20 minutes. The mixture is allowed to stand at room temperature, e.g. 20–35° C., for 40 minutes. To this mixture is then added in a dropwise fashion 17.5 g. of 2-chlorotetrahydropyran over a period of 10 minutes. The mixture is allowed to stand at room temperature, e.g. 25–30° C., for an additional 30 minutes and is then slowly added to ice water. The organic phase is extracted with ether, dried and evaporated to yield 2'-(tetrahydropyran - 2 - yloxy) - 2 - (3 - methylbut - 2-enyl)-5,9-dimethyl-6,7-benzomorphan.

EXAMPLE 3

The following derivatives are substituted for 2'-hydroxy-2-cyclopropylmethyl-5,9-dimethyl-6,7 - benzomorphan in the procedure of Example 1 or for 2'-hydroxy-2-(3-methylbut-2-enyl)-5,9-dimethyl-6,7-benzomorphan in the procedure of Example 2:

2'-hydroxy-2-(β-phenylethyl)-5,9-dimethyl-6,7,-benzomorphan;

2'-hydroxy-2-allyl-5,9-dimethyl-6,7-benzomorphan;

2'-hydroxy-2,5,9-trimethyl-5,9-dimethly-6,7-benzomorphan;

2'-hydroxy-2-methyl-5-phenyl-6,7-benzomorphan;

2'-hydroxy-2-methyl-5-(p-chlorophenyl)-6,7-benzomorphan;

2'-hydroxy-2,9-dimethyl-5-phenyl-6,7-benzomorphan;

2'-hydroxy-2-allyl-5-phenyl-6,7-benzomorphan;

2'-hydroxy-2-propargyl-5-phenyl-6,7-benzomorphan;

2'-hydroxy-2-(3-methylbut-2-enyl)-5-phenyl-6,7-benzomorphan;

2'-hydroxy-2-(3-chloroprop-2-enyl)-5-phenyl-6,7-benzomorphan;

2'-hydroxy-2-(β-phenylethyl)-5-phenyl-6,7-benzomorphan;

2'-hydroxy-2-(3-methylbut-2-enyl)-5-ethyl-9-methyl-6,7-benzomorphan;

2'-hydroxy-2-allyl-5-ethyl-9-methyl-6,7-benzomorphan;

2'-hydroxy-2-(3-chloroprop-2-enyl)-5,9-dimethyl-6,7-benzomorphan;

2'-hydroxy-2-cyclopropylmethyl-5-(β-methoxyethyl)-6,7-benzomorphan;

2'-hydroxy-2-allyl-5-(β-methoxyethyl)-6,7-benzomorphan;

2'-hydroxy-2-(3-methylbut-2-enyl)-5-(β-methoxyethyl)-6,7-benzomorphan; and

2'-hydroxy-2-propargyl-5-(β-methoxyethyl)-6,7-benzomorphan.

There are thus respectively obtained, the following compounds:

2'-(tetrahydropyran-2-yloxy)-2-(β-phenylethyl)-5,9-dimethyl-6,7-benzomorphan;

2'-(tetrahydropyran-2-yloxy)-2-allyl-5,9-dimethyl-6,7-benzomorphan;

2'-(tetrahydropyran-2-yloxy)-2,5,9-trimethyl-5,9-dimethyl-6,7-benzomorphan;

2'-(tetrahydropyran-2-yloxy)-2-methyl-5-phenyl-6,7-benzomorphan;

2'-(tetrahydropyran-2-yloxy)-2-methyl-5-(p-chlorophenyl)-6,7-benzomorphan;

2'-(tetrahydropyran-2-yloxy)-2,9-dimethyl-5-phenyl-6,7-benzomorphan;

2'-(tetrahydropyran-2-yloxy)-2-allyl-5-phenyl-6,7-benzomorphan;

2'-(tetrahydropyran-2-yloxy)-2-propargyl-5-phenyl-6,7-benzomorphan;

2'-(tetrahydropyran-2-yloxy)-2-(3-methylbut-2-enyl)-5-phenyl-6,7-benzomorphan;

2'-(tetrahydropyran-2-yloxy)-2-(3-chloroprop-2-enyl)-5-phenyl-6,7-benzomorphan;

2'-(tetrahydropyran-2-yloxy)-2-(β-phenylethyl)-5-phenyl-6,7-benzomorphan;

2'-(tetrahydropyran-2-yloxy)-2-(3-methylbut-2-enyl)-5-ethyl-9-methyl-6,7-benzomorphan;

2'-(tetrahydropyran-2-yloxy)-2-allyl-5-ethyl-9-methyl-6,7-benzomarphan;

2'-(tetrahydropyran-2-yloxy)-2-(3-chloroprop-2-enyl)-5,9-dimethyl-6,7-benzomorphan;

2'-(tetrahydropyran-2-yloxy)-2-cyclopropylmethyl-5-(β-methoxyethyl)-6,7-benzomorphan;

2'-(tetrahydropyran-2-yloxy)-2-allyl-5-(β-methoxyethyl)-6,7-benzomorphan;

2'-(tetrahydropyran-2-yloxy)-2-(3-methylbut-2-enyl)-5-(β-methoxyethyl)-6,7-benzomorphan; and 2'-(tetrahydropyran-2-yloxy)-2-propargyl-5-(β-methoxyethyl)-6,7-benzomorphan.

EXAMPLE 4

A solution of 37.6 g. of 2'-hydroxy-2-cyclopropylmethyl-5,9-dimethyl-6,7-benzomorphan in dry diethyleneglycol dimethyl ether is added in a dropwise fashion over a period of 40 minutes to a slurry of 16.0 g. of sodium hydride in 50 ml. of dry diethyleneglycol dimethyl ether. The mixture is allowed to stand at room temperature for an additional 40 minutes, and 15.5 g. of 2-chlorotetrahydrofuran are then added in a dropwise fashion over a 10-minute period. After standing at room temperature for 30 minutes, the mixture is then slowly added to ice water. The organic phase is extracted with ether, dried over sodium sulfate and evaporated to dryness to yield 2'-(tetrahydrofuranhydrofuran - 2 - yloxy) - 2 - cyclopropylmethyl-5,9-dimethyl-6,7-benzomorphan.

In a similar fashion, by employing 2.-hydroxy-2(3-methylbut-2-enyl)-5,9-dimethyl-6,7-benzomorphan in the procedure of this example, there is obtained 2'-(tetrahydrofuran-2-yloxy)-2-(3-methylbut-2-enyl)-5,9 - dimethyl-6,7-benzomorphan.

Utilization of the starting materials recited in Example 3 similarly produces the following derivatives:

2'-(tetrahydrofuran-2-yloxy)-2-(β-phenylethyl)-5,9-dimethyl-6,7-benzomorphan;

2'-(tetrahydrofuran-2-yloxy)-2-allyl-5,9-dimethyl-6,7-benzomorphan;

2'-(tetrahydrofuran-2-yloxy)-2,5,9-trimethyl-5,9-dimethyl-6,7-benzomorphan;

2'-(tetrahydrofuran-2-yloxy)-2-methyl-5-phenyl-6,7-benzomorphan;

2'-(tetrahydrofuran-2-yloxy)-2-methyl-5-(p-chlorophenyl)-6,7-benzomorphan;

2'-(tetrahydrofuran-2-yloxy)-2,9-dimethyl-5-phenyl-6,7-benzomorphan;

2'-(tetrahydrofuran-2-yloxy)-2-allyl-5-phenyl-6,7-benzomorphan;

2'-(tetrahydrofuran-2-yloxy)-2-propargyl-5-phenyl-6,7-benzomorphan;

2'-(tetrahydrofuran-2-yloxy)-2-(3-methylbut-2-enyl)-5-phenyl-6,7-benzomorphan;

2'-(tetrahydrofuran-2-yloxy)-2-(3-chloroprop-2-enyl)-5-phenyl-6,7-benzomorphan;

2'-(tetrahydrofuran-2-yloxy)-2-(β-phenylethyl)-5-phenyl-6,7-benzomorphan;

2'-(tetrahydrofuran-2-yloxy)-2-(3-methylbut-2-enyl)-5-ethyl-9-methyl-6,7-benzomorphan;

2'-(tetrahydrofuran-2-yloxy)-2-allyl-5-ethyl-9-methyl-6,7-benzomorphan;

2'-(tetrahydrofuran-2-yloxy)-2-(3-chloroprop-2-enyl)-5,9-dimethyl-6,7-benzomorphan;

2'-(tetrahydrofuran-2-yloxy)-2-cyclopropylmethyl-5-(β-methoxyethyl)-6,7-benzomorphan;

2'-(tetrahydrofuran-2-yloxy)-2-allyl-5-(β-methoxyethyl)-6,7-benzomorphan;

2'-(tetrahydrofuran-2-yloxy)-2-(3-methylbut-2-enyl)-5-(β-methoxyethyl)-6,7-benzomorphan; and 2'-(tetrahydrofuran-2-yloxy)-2-propargyl-5-(β-methoxyethyl)-6,7-benzomorphan.

EXAMPLE 5

One gram of morphine, 4 ml. of pyridine and 1 ml. of acetic anhydride are allowed to stand at room temperature for 14 hours. The mixture is then poured into ice water. The organic material is collected and added to 10 ml. of acetic acid. This mixture is allowed to stand at room temperature for 30 minutes and is then poured into ice water. The organic phase is extracted with benzene, and these extracts are washed with dilute sodium bicarbonate solution and dried. To the dried organic solution is added 2 ml. of dihydropyran. This mixture is distilled briefly to remove any moisture as an azeotrope, and about 0.4 g. of p-toluenesulfonic acid is then added to the cooled solution. This mixture is allowed to stand for about four days at room temperature and is then washed with dilute sodium carbonate solution and then with water, dried and evaporated to dryness. The residue is dissolved in 9:1 methanol:water and allowed to stand with an equal weight of potassium bicarbonate for about 15 hours (e.g. overnight). At the end of this time, the mixture is extracted with methylene chloride. These extracts are washed with water, dried and evaporated to dryness to yield the 3-(tetrahydropyran-2-yl) ether of morphine.

By subjecting nalorphine to the procedure of this example, there is obtained the 3-(tetrahydropyran-2-yl) ether of nalorphine.

The 3-(tetrahydrofuran-2-yl) ethers of morphine and nalorphine are similarly obtained by substituting dihydrofuran for tetrahydropyran in the foregoing procedure with the respective 3-hydroxy starting materials.

EXAMPLE 6

By subjecting desomorphine, 3-hydroxy-N-allylmorphinan, dihydromorphinone, and 3-hydroxy-n-cyclopropylmethyl-morphinan to the procedure of either Example 1 or Example 2, there is obtained:

3-(tetrahydropyran-2-yloxy)-4,5-oxido-N-methylmorphinan;
3-(tetrahydropyran-2-yloxy)-N-allylmorphinan;
3-(tetrahydropyran-2-yloxy)-4,5-oxido-6-oxo-N-methylmorphinan; and
3-(tetrahydropyran-2-yloxy)-N-cyclopropylmethyl-morphinan, respectively.

Utilization of these starting materials in the procedure of Example 4 similarly yields:

3-(tetrahydrofuran-2-yloxy)-4,5-oxido-N-methylmorphinan;
3-(tetrahydrofuran-2-yloxy)-N-allylmorphinan;
3-(tetrahydrofuran-2-yloxy)-4,5-oxido-6-oxo-N-methylmorphinan; and
3-(tetrahydrofuran-2-yloxy)-N-cyclopropylmethyl-morphinan.

EXAMPLE 7

The following compounds are substituted for 2'-hydroxy-2-cyclopropylmethyl-5,9-dimethyl-6,7-benzomorphan in the procedure of Example 1:

2'-hydroxy-2-ethylcarbamyl-5-phenyl-6,7-benzomorphan;
2'-hydroxy-2-carbamyl-5-phenyl-6,7-benzomorphan;
2'-hydroxy-2-carbamyl-5-(p-chlorophenyl)-6,7-benzomorphan;
2'-hydroxy-2-carboxyamido-5-(p-chlorophenyl)-6,7-benzomorphan;
2'-hydroxy-2-carbophenoxy-5-phenyl-6,7-benzomorphan; and
2'-hydroxy-2-carbethoxy-5-($\beta$-methoxyethyl)-6,7-benzomorphan.

There are thus respectively obtained the following derivatives:

2'-(tetrahydropyran-2-yloxy)-2-ethylcarbamyl-5-phenyl-6,7-benzomorphan;
2'-(tetrahydropyran-2-yloxy)-2-carbamyl-5-phenyl-6,7-benzomorphan;
2'-(tetrahydropyran-2-yloxy)-2-carbamyl-5-(p-chlorophenyl)-6,7-benzomorphan;
2'-(tetrahydropyran-2-yloxy)-2-carboxyamido-5-(p-chlorophenyl)-6,7-benzomorphan;
2'-(tetrahydropyran-2-yloxy)-2-carbophenoxy-5-phenyl-6,7-benzomorphan; and
2'-(tetrahydropyran-2-yloxy)-2-carbethoxy-5-($\beta$-methoxyethyl)-6,7-benzomorphan.

Likewise, by substituting the foregoing starting materials in the procedure of Example 4, the corresponding 2'-(tetrahydrofuran-2-yloxy)-6,7-benzomorphan derivatives are obtained.

The requisite starting materials described above may be prepared according to the methods described in Netherlands Patents 6,414,820 and 6,414,821.

What is claimed is:

1. Compounds of the formula:

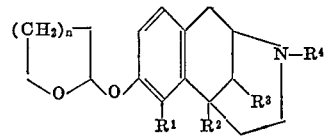

wherein $n$ has a value of 1 or 2 and $R^2$ and $R^3$ taken together are:

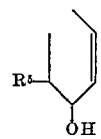

wherein $R^1$ taken together with $R^5$ is oxido and $R^4$ is methyl or allyl;

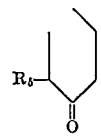

wherein $R^1$ taken together with $R^5$ is oxido and $R^4$ is methyl; or

wherein $R^1$ is hydrogen and $R^4$ is methyl, allyl or cyclopropylmethyl.

2. The compound according to claim 1 wherein $n$ is 1, $R^4$ is methyl, $R^2$ and $R^3$ together are the group

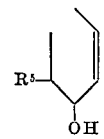

and $R^1$ and $R^5$ together are oxido.

3. The compound according to claim 1 wherein $n$ is 2, $R^4$ is methyl, $R^2$ and $R^3$ together are the group

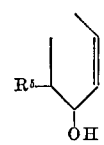

and $R^1$ and $R^5$ together are oxido.

4. The compound according to claim 1 wherein $n$ is 1, $R^4$ is methyl, $R^2$ and $R^3$ together are

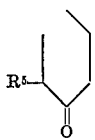

and $R^1$ and $R^5$ together are oxido.

5. The compound according to claim 1 wherein $n$ is 2, $R^4$ is methyl, $R^2$ and $R^3$ together are

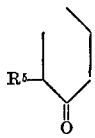

and $R^1$ and $R^5$ together are oxido.

6. The compound according to claim 1 wherein $n$ is 1, $R^4$ is allyl, $R^2$ and $R^3$ taken together are

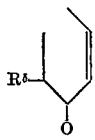

and $R^1$ and $R^5$ taken together are oxido.

7. The compound according to claim 1 wherein $n$ is 2, $R^4$ is allyl, $R^2$ and $R^3$ taken together are

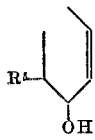

and $R^1$ and $R^5$ taken together are oxido.

8. The compound according to claim 1 wherein $n$ is 1, $R^1$ is hydrogen, $R^2$ and $R^3$ together are $\alpha,\delta$-butylene, and $R^4$ is methyl.

9. The compound according to claim 1 wherein $n$ is 2, $R^1$ is hydrogen, $R^2$ and $R^3$ together are $\alpha,\delta$-butylene, and $R^4$ is methyl.

10. The compound according to claim 1 wherein $n$ is 1, $R^1$ is hydrogen, $R^2$ and $R^3$ together are $\alpha,\delta$-butylene, and $R^4$ is allyl.

11. The compound according to claim 1 wherein $n$ is 2, $R^1$ is hydrogen, $R^2$ and $R^3$ together are $\alpha,\delta$-butylene, and $R^4$ is allyl.

12. The compound according to claim 1 wherein $n$ is 1, $R^1$ is hydrogen, $R^2$ and $R^3$ taken together are $\alpha,\beta$-butylene, and $R^4$ is cyclopropylmethyl.

13. The compound according to claim 1 wherein $n$ is 2, $R^1$ is hydrogen, $R^2$ and $R^3$ taken together are $a,\beta$-butylene, and $R^4$ is cyclopropylmethyl.

References Cited

UNITED STATES PATENTS

| | | | |
|---|---|---|---|
| 3,211,738 | 10/1965 | Sawa et al. | 260—285 |
| 3,254,088 | 5/1966 | Lewenstein et al. | 260—285 |
| 3,285,922 | 11/1966 | Gates | 260—285 |
| 3,325,502 | 6/1967 | Kugita | 260—285 X |
| 3,332,950 | 7/1967 | Blumberg et al. | 260—285 |
| 3,393,197 | 7/1968 | Pachter et al. | 260—285 |

FOREIGN PATENTS

Sitionogi, Netherlands Specification 6,604,345, Oct. 3, 1966, Abstracted in Chem. Abstr., vol. 66, col. 95315 (1966).

DONALD G. DAUS, Primary Examiner

U.S. Cl. X.R.

260—247.2, 290, 294, 294.3, 294.7, 326.8, 345.1, 346.1, 543